United States Patent
Findlay

(10) Patent No.: US 10,271,183 B2
(45) Date of Patent: Apr. 23, 2019

(54) METHOD AND SYSTEM FOR COMMUNICATION BETWEEN USERS AND COMPUTER SYSTEMS

(71) Applicant: SITA INFORMATION NETWORKING COMPUTING IRELAND LIMITED, Windyhall (IE)

(72) Inventor: Denise Findlay, Hayes (GB)

(73) Assignee: SITA INFORMATION NETWORKING COMPUTING IRELAND LIMITED, Windyhall (IE)

( * ) Notice: Subject to any disclaimer, the term of this patent is extended or adjusted under 35 U.S.C. 154(b) by 0 days.

(21) Appl. No.: 15/578,969

(22) PCT Filed: Dec. 23, 2015

(86) PCT No.: PCT/EP2015/081210
§ 371 (c)(1),
(2) Date: Dec. 1, 2017

(87) PCT Pub. No.: WO2017/108137
PCT Pub. Date: Jun. 29, 2017

(65) Prior Publication Data
US 2018/0288578 A1    Oct. 4, 2018

(51) Int. Cl.
*H04W 4/12* (2009.01)
*G06Q 10/02* (2012.01)
(Continued)

(52) U.S. Cl.
CPC .............. *H04W 4/12* (2013.01); *G06Q 10/02* (2013.01); *G06Q 30/06* (2013.01); *G10L 15/26* (2013.01); *H04L 69/16* (2013.01)

(58) Field of Classification Search
CPC ...................................................... H04W 4/12
(Continued)

(56) References Cited

U.S. PATENT DOCUMENTS 6,873,687 B2 *  3/2005  Smith, II ............ H04M 1/6505
                                                         379/88.13
8,321,852 B2 * 11/2012  Shenfield ............ G06F 9/44521
                                                         717/122
(Continued)

FOREIGN PATENT DOCUMENTS

DE         20212325 U1    10/2002
EP          1096402 A2     2/2001
(Continued)

OTHER PUBLICATIONS

International Search Report and Written Opinion mailed in International Patent Application No. PCT/EP2015/081210 dated Sep. 2, 2016.
(Continued)

*Primary Examiner* — Michael T Vu
(74) *Attorney, Agent, or Firm* — Morris, Manning & Martin LLP; Daniel E. Sineway, Esq.; R. Lee Strasburger, Jr., Esq.

(57) ABSTRACT

In an interactive on-line system such as an airline reservation system, users communicate with the system via smart devices. Communication between the device and the system is via asynchronous TCP/IP messaging or SMS text message. The user can input text messages which include metadata to assist in message recognition. A translator parses the message and converts the message into an industry standard format which is then sent to a relevant system for processing. The translator may form a part of an application on the device, be located at the system or at an intermediate point. A response from the system is converted from industry standard format to a human readable form and sent as asynchronous message or SMS/MMS text message back to the user where it may be displayed as text of converted into speech.

26 Claims, 5 Drawing Sheets

(51) Int. Cl.
*G06Q 30/06* (2012.01)
*G10L 15/26* (2006.01)
*H04L 29/06* (2006.01)

(58) Field of Classification Search
USPC .......................................................... 455/466
See application file for complete search history.

(56) References Cited

U.S. PATENT DOCUMENTS

| | | |
|---|---|---|
| 2003/0101071 A1 | 5/2003 | Salonen |
| 2007/0167178 A1 | 7/2007 | Al-Harbi |
| 2011/0173001 A1* | 7/2011 | Guy, III .............. G06F 17/2276 704/246 |
| 2012/0208568 A1 | 8/2012 | Cooley |
| 2012/0215695 A1 | 8/2012 | Salonen |
| 2012/0289191 A1 | 11/2012 | Puura |

FOREIGN PATENT DOCUMENTS

| | | |
|---|---|---|
| WO | 2008050217 A1 | 5/2008 |
| WO | 2009152185 A2 | 12/2009 |

OTHER PUBLICATIONS

Notification of Transmittal of the International Search Report and the Written Opinion of the International SEarching Authority, or the Declaration, issued in International Application No. PCT/EP2015/065774, dated Sep. 15, 2015; 9 pages.

Search Report issued in Great Britain application No. GB1412407.7, searched Jan. 9, 2015; 2 pages.

* cited by examiner

METHOD AND SYSTEM FOR COMMUNICATION BETWEEN USERS AND COMPUTER SYSTEMS

CROSS REFERENCE TO RELATED APPLICATIONS

This application is a national phase application of, and claims benefit of and priority to International Application No. PCT/EP2015/081210, filed Dec. 23, 2015, entitled "Method and System for Communication Between Users and Computer Systems," the disclosure of which is incorporated herein by reference as if set forth herein in its entirety.

TECHNICAL FIELD

This invention relates to communications between users and computer systems.

BACKGROUND

In many industries, on-line services have developed over recent years which enable interaction between a consumer and the computer systems of a service provider. One example is in the airline industry. Most airlines operate on-line reservation systems which enable their customers to make and amend flight bookings and arrange other related services.

Typically, access is via a secure website and messages are transported to the airline's computer systems via web-service calls using HTTP protocol. HTTP is a World Wide Web protocol and its use is limited to the World Wide Web. Web service calls are typically blocking calls which terminate when a response is received from the airline system.

In recent years there has been a proliferation of devices which can access web services. Whereas a few years ago access was essentially limited to desktop and lap top computers, there are now many smart devices, such as tablets and smart phones, provided by a range of different manufacturers using a variety of operating systems. The airline or other service provider must be able to accept communications from any of these devices and must therefore develop web applications for each of these channels and, moreover, support all of these channels. Any change in the configuration of the device or its operating system requires rigorous testing. Regression testing is particularly burdensome and must be performed every time a device provider releases a software upgrade. Moreover, when the airline or other service provider make a change to their own software, that change must be tested exhaustively across all channels which is both time consuming and expensive. It is estimated that the cost of developing a new reservation GUI to an airline can be up to $10 million and the maintenance of all the services can occupy up to 100 people in a medium sized airline.

While the airline industry is a good example of this problem, it also exists in many other industries which deliver complex interactive services to users including, for example, banking, hotel and other travel industries.

Within the airline industry, the developing use of web services creates further problems. As well as using web services to communicate with customers, airlines use web services for a complex network of communications with agents and a variety of airline systems. Necessarily, airline representatives are located around the world, often at airports with poor internet access and the lack of available bandwidth in some locations can make web services hard to run and an inappropriate way of communicating between systems.

We have appreciated that consumer interactions are increasingly person to person interactions regardless of whether they are via the internet or a mobile phone network. This contrasts with interactions with an airline core system in which the interaction with the consumer is via a GUI which then interacts with the airline core system. This approach is very common for interactions made via the internet for many businesses.

The invention aims to address the problems outlined above.

BRIEF SUMMARY OF THE DISCLOSURE

According to the invention there is provided a method of communicating between a telecommunications device and a computer system comprising: receiving an input from the user to a messaging application on the device, the input including metadata and natural language; communicating the user input to a translator; at the translator mapping the message to convert the message into a standardised message format at least in part based on the metadata; sending the standardised message format to a computer system of the receiving party; wherein at least one of the communicating the user input and sending the standardised message format is performed using an asynchronous message or text message; receiving a response from the computer system at the translator, the response being in a standardised format; the translator mapping the response into a human readable form; communicating the human readable response to the user device; wherein at least one of the receiving a response from the computer system and the communicating the human readable response is performed using an asynchronous message or text message; and providing the response to the user at the user device.

The invention also provides a telecommunications device having stored thereon a messaging application, which when run on the device causes the device to receive an input from the user to the messaging application, the input including metadata and natural language; communicate the user input to a translator; at the translator, map the message to convert the message into a standardised message format at least in part based on the metadata; send the standardised message format to a computer system of a receiving party; wherein at least one of the communicating the user input and sending the standardised message format is performed using an asynchronous message or text message; receive a response from the computer system at the translator, the response being in a standardised format, the translator mapping the response into a human readable form; communicate the human readable response to the user device; wherein at least one of the receiving a response from the computer system and the communicating the human readable response is performed using an asynchronous message or text message; and provide the response to the user at the user device.

A further aspect of the invention provides a method of communicating between a telecommunications device and a computer system comprising: receiving an input from the user to a messaging application on the device, the input including metadata and natural language; communicating the user input to a translator; at the translator mapping the message to convert the message into a standardised message format at least in part based on the metadata; sending the standardised message format to a computer system of the receiving party; wherein at least one of the communicating the user input and sending the standardised message format is performed using an IoT messaging protocol; receiving a response from the computer system at the translator, the response being in a standardised format; the translator mapping the response into a human readable form; communicating the human readable response to the user device; wherein at least one of the receiving a response from the computer system and the communicating the human readable response is performed using an IoT messaging protocol; and providing the response to the user at the user device.

Embodiments of the invention may have the advantage that they enable messages to be sent in natural language by users, who may be airline customers, agents, airline employees or others. These message are translated into a format that is recognised by core systems. By using metadata in the message input by the user, the translation of the natural language message is made much easier. The use of TCP/IP or text messaging enables the system to be used in locations where there is little internet bandwidth.

In one embodiment of the invention the application is specific to a given service provider or group or service providers. This has the advantage that the application can be pre-loaded with destination addresses, for example SMS/MMS short codes or IP addresses to make sending of messages by users more simple. Moreover, messages may be sent over a private phone of secure network such as is available in some airports which can increase security. Alternatively, the application may be common to a plurality of service providers and the user input includes a telephone number or short code of a selected service provider. In one embodiment the messaging application includes the address of the computer system and identification of the user of the device.

The metadata may include at least one emoticon or at least one emoji.

In an embodiment of the invention the text message may be transmitted via a mobile telephone network. Alternatively, the message is an asynchronous message and is transmitted over the internet using TCP/IP addressing.

In one embodiment of the invention the input from the user is speech and the device includes a speech recognition application to convert the speech into natural language. This has the advantage that the user does not need to use a keyboard or similar apparatus to input a message into the device.

The conversion of speech may include identifying at least one keyword in the speech input by the user and converting the keyword into a metadata symbol In one embodiment the response is provided to the user either for display to the user on the telecommunications device or for presentation to the user as speech.

The translator may be resident on the telecommunications device, at the computer system of the receiving party or intermediate the user's device and the receiving party computer system. The translator may include, or be coupled to, a communicator arranged to receive the translated standardised message output from the translator and for adding to the output of the translator a header including one or more of security information and routing information.

Where the message is a text message it may be is an SMS or MMS text message.

BRIEF DESCRIPTION OF THE DRAWINGS

Embodiments of the invention will now be described, by way of example only, with reference to the accompanying drawings, in which.

DETAILED DESCRIPTION

Figure 1:
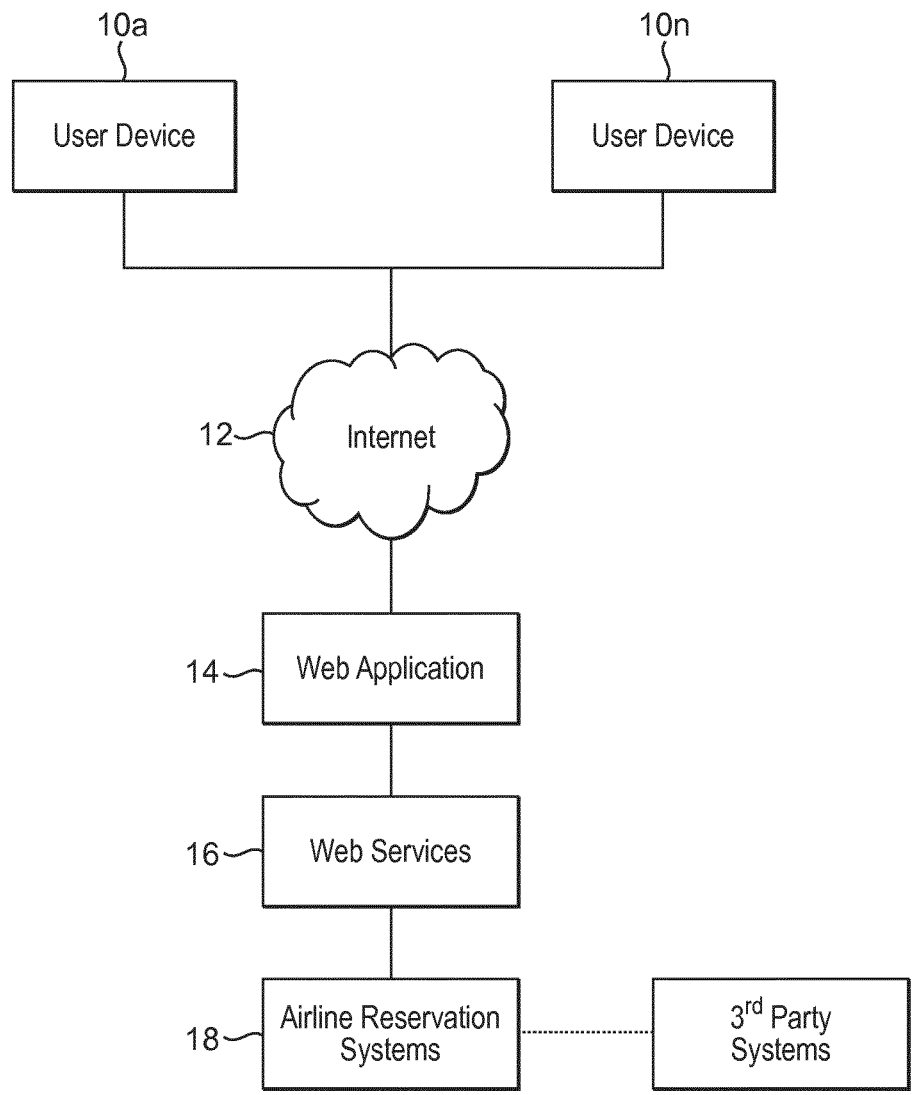
FIG. 1 illustrates a known interaction between users and an airline reservation system.

FIG. 1 illustrates how an airline customer typically accesses an airline reservation system in a known environment. The customer accesses a web application 14 via a web browser on their user device 10a . . . 10n via the internet 12. The user enters information into predefined fields specified by the web application which receives those fields of data and creates web service HTTP calls to a service that communicates with the reservation system. The reservation system is one of many systems which can be accessed in this manner. The web service call is a blocking call and the communication continues until a response is received to the call. The communication may be, for example, via an Oracle® Service Bus.

An airline's systems will comprise a number of different legacy systems which do not necessarily communicate directly with one another and which operating using different protocols. It is common practice to use a translator which maps electronic messages received from one system component onto a standard message format that can be understood. One example of standardised messages is a standard titled "Passenger and Airport Data Interchange Standards (PADIS) published by IATA (International Air Transport Association). The translator is effectively a look-up table, or series of look-up tables that is used to map a non-industry standard electronic message format onto a standard electronic message format.

Figure 2:
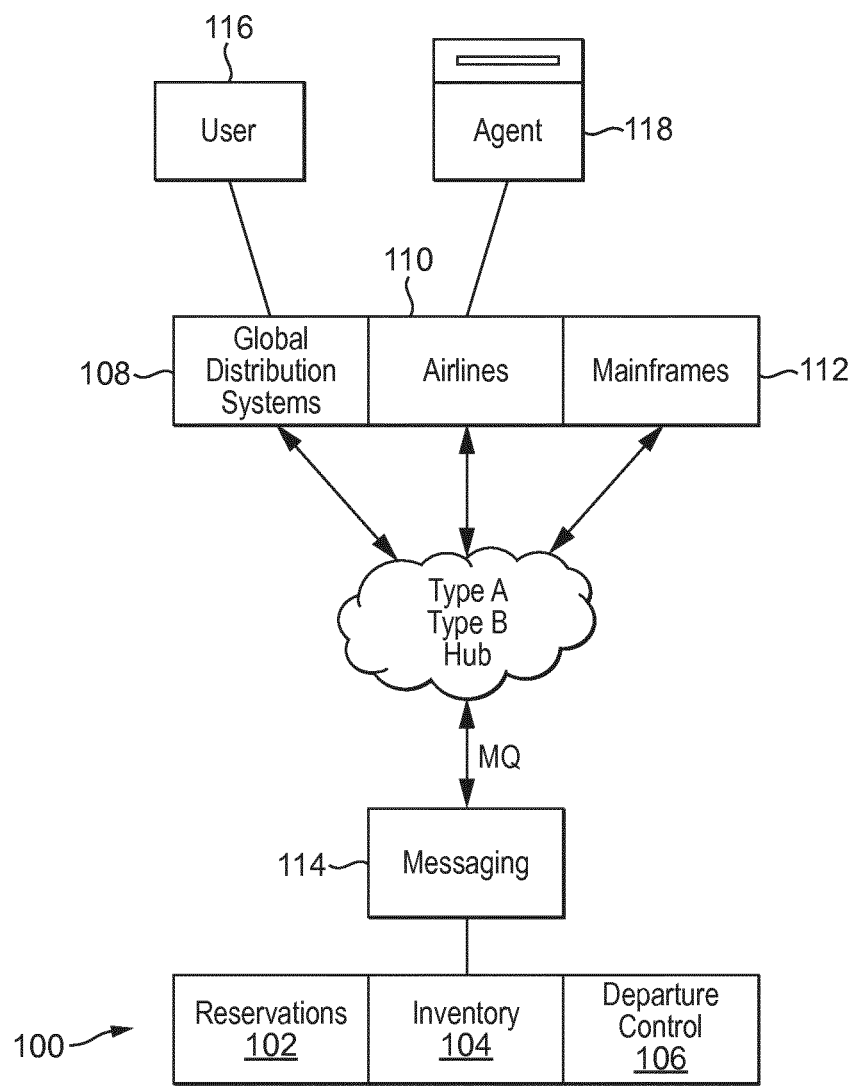
FIG. 2 illustrates an embodiment of present invention.

FIG. 2 shows an embodiment of the present invention in which the consumer uses text, messaging and voice to communicate with an airline core system in the same manner as they would do with other humans. Although the embodiment described in this example is used with an airline core system this is purely exemplary and the invention is applicable to any reservation system and may include, for example, other forms of travel such as ship or train or hotel and other accommodation reservation. The communication between the consumer and the system in the example may be over an IP network or a mobile phone network. This approach has the advantage that it requires very low bandwidth and so is particularly suited to use in airports with poor communications, for example in remote areas.

FIG. 2 shows, in outline, an embodiment of the invention. An airline reservation system is shown generally at 100. The system is complex and comprises many components of which a reservation module 102, an inventory module 104 and a departure control module 106 are shown. Unlike the prior art example of FIG. 1, the communication is not via webservices but via messaging. The messages maybe sent from global distribution systems 108, airlines 110 or mainframes 112 and communicate with a messaging component 114 of the reservation system. The messaging may be in one of a number of standard formats such as IATA Type A or IATA type B IATA (International Air Transport Association) Type A and Type B messaging is a well-established messaging format that has been used for many years as a standard for ground to ground communication protocols within the airline industry.

In recent years, consumers have got used to, and become adept at, communicating with each other via text messages and internet based messaging. Text messages are short messages sent from one mobile device to another or from fixed or portable devices over a mobile communications network. Text messages may use the Short Message Service (SMS) or include images, video or audio (MMS). Internet messaging is via instant messaging which is an alternative to texting that does not require a mobile phone network. Messages sent by text or IM are in natural language supplemented by short hand codes and metadata. Moreover, consumers are increasingly using speech recognition software. In the embodiment to be described, communication for the consumer is made more natural and all users communicate with the airline core system using messaging in the manner that systems do at present. Thus, consumers communicate with the core systems using a messaging app or text instead of via a GUI application or web site making web-service calls. Thus the need for expensive GUIs and for individual GUIs for each of a large range of devices, is avoided.

Thus in embodiments of the invention, both a consumer or user channel, that is a direct channel from the customer to the airline, shown at 116 in FIG. 2 and the agent channel, that is the channel from intermediary agents and shown at 118 in FIG. 2 can use messaging to avoid using resource heavy GUIs in low bandwidth situations.

The embodiment involves humans communicating with core systems using messaging with the content of the messages being natural language supplemented by short hand codes and metadata. The message content to the consumer or agent may be indistinguishable from a message sent to a friend or colleague, whereas to the system core the received message is indistinguishable from one received from another core system. Referring back to FIG. 2, airline core systems 108, 110, 112 communicate with Global Distribution Systems (GDS) via messaging using one of a number of well-known messaging protocols. They also communicate with other third party computer systems such as Revenue Management systems. Messages are sent to and from an airline gateway and the routed on. In the present embodiment, messages from a consumer or agent are also sent to this gateway over an IP network or mobile communications network. In one embodiment, although not essential the messages may be sent using a short code. Short codes are special abbreviated telephone numbers that are significantly shorter than a full telephone number and can be used to address SMS and MMS messages. Short codes can also be used with IP network based instant messages.

Although any messaging protocol may be used, it is presently preferred to use one of IATA Type A, IATA Type B, EDIFACT or NDC (New Distribution Capability). IATA Type A messaging is used for real time interactive communications based on IATA legacy protocols, whereas Type B is used for reliable and business critical messaging communications. The main characteristics of Type B are security, reliability, high availability and assured delivery with tracing and reporting mechanisms.

EDIFACT (ISO 9735) is an international standard for electronic data interchange (Electronic Data Interchange For Administration, Commerce and Transport). NDC is a new XML-based data transmission standard provided by IATA.

The airline gateway is configured to accept messages from the source short code, airline messaging application or a standard messaging application provided with suitable addressing. Typically a messaging application unique to an airline or group of airlines may be provided by the airline to customers. Such an application is configured for connection to the airline's gateway, or the gateways of airlines in the group and includes the customer's profile so enabling the customer to pay for additional services.

In order to interact with the application the user, or customer may for example use speech recognition software. The speech recognition software may be capable of sending text or instant messages via a mobile or IP network which contain a limited number of keywords. Alternatively, the uses may formulate a message, for example using a keyboard or keypad input, according to a limited number of domain specific rules using symbols as metadata.

Figure 3:
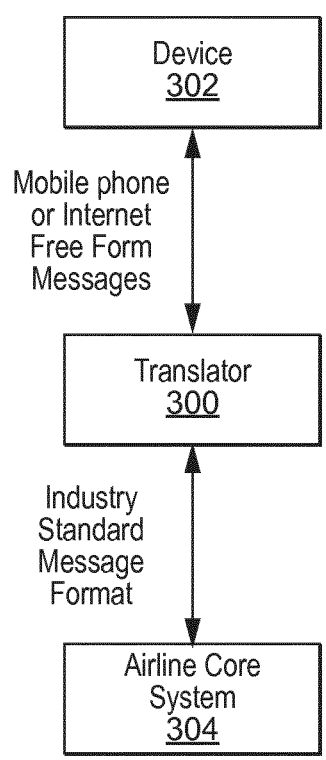
FIG. 3 is a schematic view of a translator between the user device and an airline core system.

Once formulated, the text or instant message is sent to a translator which translates the human readable message into a message in the format of whatever standard messaging protocol is being used by the system. The translated message is then sent to the pre-configured airline gateway. This arrangement is shown in FIG. 3 in which a translator 300 is arranged between a device 302 and an airline core system 304. The device has text messaging capabilities and is connected to the internet or mobile phone network to send messages as texts or IP messages to the translator.

The translator 300 converts the human readable message into an industry standard message and sends that message to the pre-configured airline gateway. The translator may comprise a look up table. The translator receives messages as free form messages or SMS texts from users and parses those messages to identify message content. This message content can then be mapped onto a standard format that can be recognised by the airline systems. In order to translate the message, the message content may require some metadata in the form of symbols in the body of the message. For example the symbol % may represent a booking reference and indicate that the text that follows the symbols is a booking reference. The % is a purely arbitrary symbol.

In addition to traditional metadata symbols, emoticons or emojis may be used as metadata. Both emoticons and emojis are ideographs or pictographs. Whereas emoticons are constructed using characters available on a standard keyboard, emojis are provided as a font. An example of an emoticon is :-) for OK. There is a large range of emojis available on most phones and other devices. If the user is speaking in natural language then metadata is not used just key words. However, the speech recognition software will incorporate the relevant metadata into the text output based on the keywords detected in the speech.

Some examples of more traditional metadata that may be used are:

The '$' symbol is used for action when using text or messaging

The '%' symbol is used for identity, in this case using the Booking Reference as the primary key For example:

Person natural language="I'd like to change my flight to a later flight" Text or Msg=$Change flight to later %546YT6 (Either the natural language is mapped to this or the person inputs the text directly).

Here the speech recognition software has detected the keywords 'change', 'flight' and 'later' and inserted the relevant metadata into the text or message.

In contrast to the manner in which a user enters data for a web browser, users of text messages are familiar with messaging in a manner which is similar to a computer language. For example, text speak has evolved as a series of acronyms or contractions which represent longer text. An example is LOL meaning laugh out loud. It is a short step for users to input messages to the system in a format which can easily be mapped by the translator into a PADIS compliant format.

Unlike conventional machine-to-machine translators, the translator 300 can communicate with the user to indicate that a message is not understood.

As mentioned, the messaging used by users will include metadata, which signals to the translator the context of the message. Users are already familiar with such metadata from email in which @ means "to" and websites such as Twitter where # represents "about" or "with regard to". Through gradual training of individual users and the community of users as a whole, users will be able to interact effectively with the system.

In addition to communicating in text message format, the input from the user could be in voice format in which case it is converted to natural language text before being passed to the translator although in one embodiment, this function is also performed by the translator.

Thus, the purpose of the translator is to rewrite messages received from users in an industry standard format that can be understood by the computer systems to which they are to be directed. In many cases this is a straightforward task for example where a request has a simple answer or a yes/no answer. An example might be a request for availability on a given flight on a given day. However more complex messages such as what seats are available may have many, or many thousands of possible responses. The system may require further input from the user, for example to specify the "best available" "aisle" or "nearest front" to enable a compact response to be sent to the user.

As well as translating natural language inputs from a user to an industry standard code, the translator can also perform the reverse task, translating responses from the system back into a format that can be understood by the user.

As mentioned above, a user can input messages into the system using spoken messages. These may be converted into natural language text by speech recognition software which may be provided on the user's device. This speech recognition software may be a generic application which is well known and widely available or made be part of a travel or an airline specific application. This latter possibility has the advantage that the speech recognition software may be pre-configured to recognise terms that are likely to be input by the user. As mentioned above, a travel or airline specific messaging application may also be provided. This may include the speech recognition capability. A bespoke messaging application has the advantage that it may be pre-configured to include the user's profile and the details of the airline or other travel related gateway. A bespoke messaging application is better able to decipher the intended meaning of a message received from a user as it can be preconfigured to look for keywords. It may also be aware of the identity of the user as it may require a user login. Thus the application is aware of any flights that the user has booked and to which their messages may relate.

The translator may also be part of the airline of travel related application. Thus it may be resident on the user's device or it may be remote from the user's device as illustrated schematically in FIG. 3. When the person is communicating via text message to a short code the Translator may be on the airline system, when the user is communicating via an airline application the translator may be on the device. The user can communicate with the airline core system via a variety of devices. The user's words are converted into an airline message by the translator and sent to the airline gateway. The gateway then routes the message to the appropriate domain within the airline core system and receives an asynchronous message in reply. This message is routed back to the source and converted back into natural language, and possibly speech and presented to the user.

Figure 4:
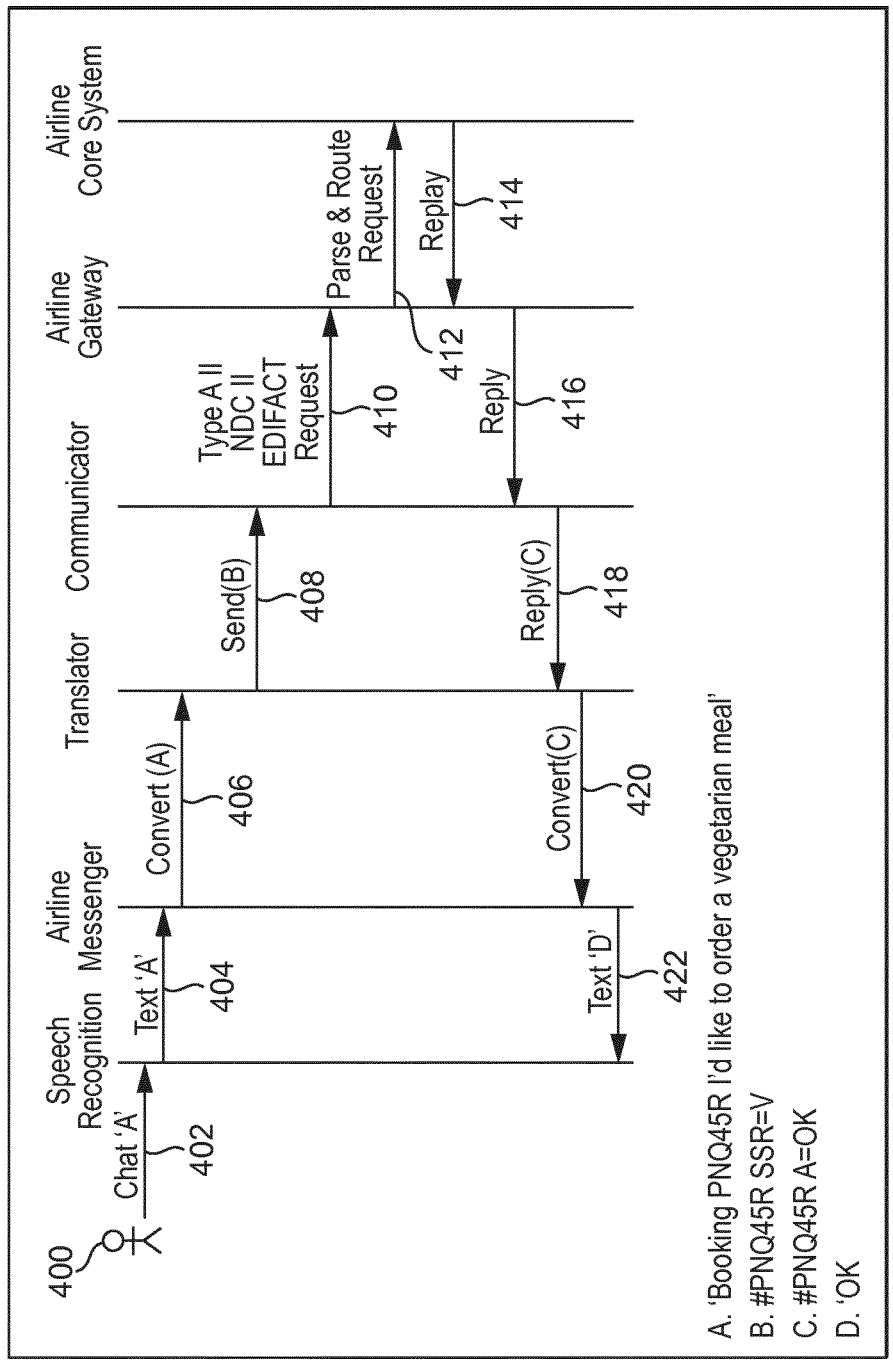
FIG. 4 shows the logical architecture of an embodiment of the invention using speech recognition.

FIG. 4 shows an example of the logical architecture of an embodiment of the invention. In this example it is assumed that the airline gateway connection information has been configured and that the message protocol has been configured. This example relates to a passenger who has made a reservation and now wants to update the reservation to indicate that she wants a vegetarian meal. The passenger is indicated generally at 400. At 402 she speaks to her device, telling the speech recognition software that she wants a vegetarian meal. This instruction will include certain keywords and information. The message, indicated as A in the figure may be, for example, 'Booking reference PNQ45R I'd like to order a vegetarian meal'. If metadata is being used the message may commence % PNQ45R . . . . The voice recognition software converts this instruction into natural language text at step 404 and retrieves booking information for the passenger and at step 406 sends the text and the booking reference to the translator which may be remote or resident on the device. At step 408, the translator converts the natural language text to an airline message in accordance with the configuration. This may be done by retrieving the appropriate message using a look-up table and based on keywords in the natural language message. The message is now shown as B in FIG. 4 and may be '#PNQ45R SSR=V'. This message is sent to the communicator which wraps the message in the appropriate header and uses the configured connection to send it, at step 410, as an IP message or text message to the airline gateway, using, for example, a Type A II, NDC II or EDIFACT protocol request. The message is received at the airline gateway, parsed and, according to content, sent at step 412 to the appropriate core system which receives the message as sends a reply to the gateway at step 414. This reply is sent to the communicator at step 416 which strip out any extraneous details and then to the translator at step 418. The message received at the translator is in the form '#PNQ45R A=OK' that is it is an airline message in the correct format. The translator converts this message back in natural text at step 420 and sends it back as natural text to the user. The final natural text format, indicated as D in the figure might simply be 'OK'.

In the following example, instead of returning the natural language message 'OK' to the user, the message 'Cost is £15' is returned, indicating to the user that she must pay £15 to secure her vegetarian meal. In response to this message, the user now replies, in natural language 'OK' indicating agreement and this agreement is sent to the messenger. The messenger retrieves payment details which is possible as the user is preregistered with the airline by virtue of subscription to the application. If necessary the messenger can communicate with the user to obtain any further details needed to complete the transaction. The messenger then sends the payment details and the vegetarian meal request to the translator which translates it into the configured message protocol and sends it to the communicator. The communicator takes the translated message output by the translator and adds a header to it, the message forming the body. The header may include information about the message such as destination and security. The communicator may be part of the translator or a separate component. The communicator retrieves the configured routing and any configured payment details and sends them to the airline gateway which routes them to the relevant core system. The core system then returns a message to the gateway which, as in the example of FIG. 4 above, is returned to the communicator where extraneous details are stripped off and the remaining message sent to the translator where it is converted into a natural language reply and sent to the user. The examples described begin with the application recognising a speech input from the user. In an alternative embodiment voice recognition is not necessary and the user may input their request directly as a text or IP message. For a text message, the user must be provided with a short code, or other number to send the text to and for an IP message an IP address is necessary. Both direct the message to the airline or other gateway. The user will text the message #RFD45T R=Veg Meal. This message includes the booking message and a request R for a vegetarian meal. This message is forwarded to a server which includes the translator component described above which translates the text into an airline message. The process then continues as described with respect to FIG. 4.

Figure 5:
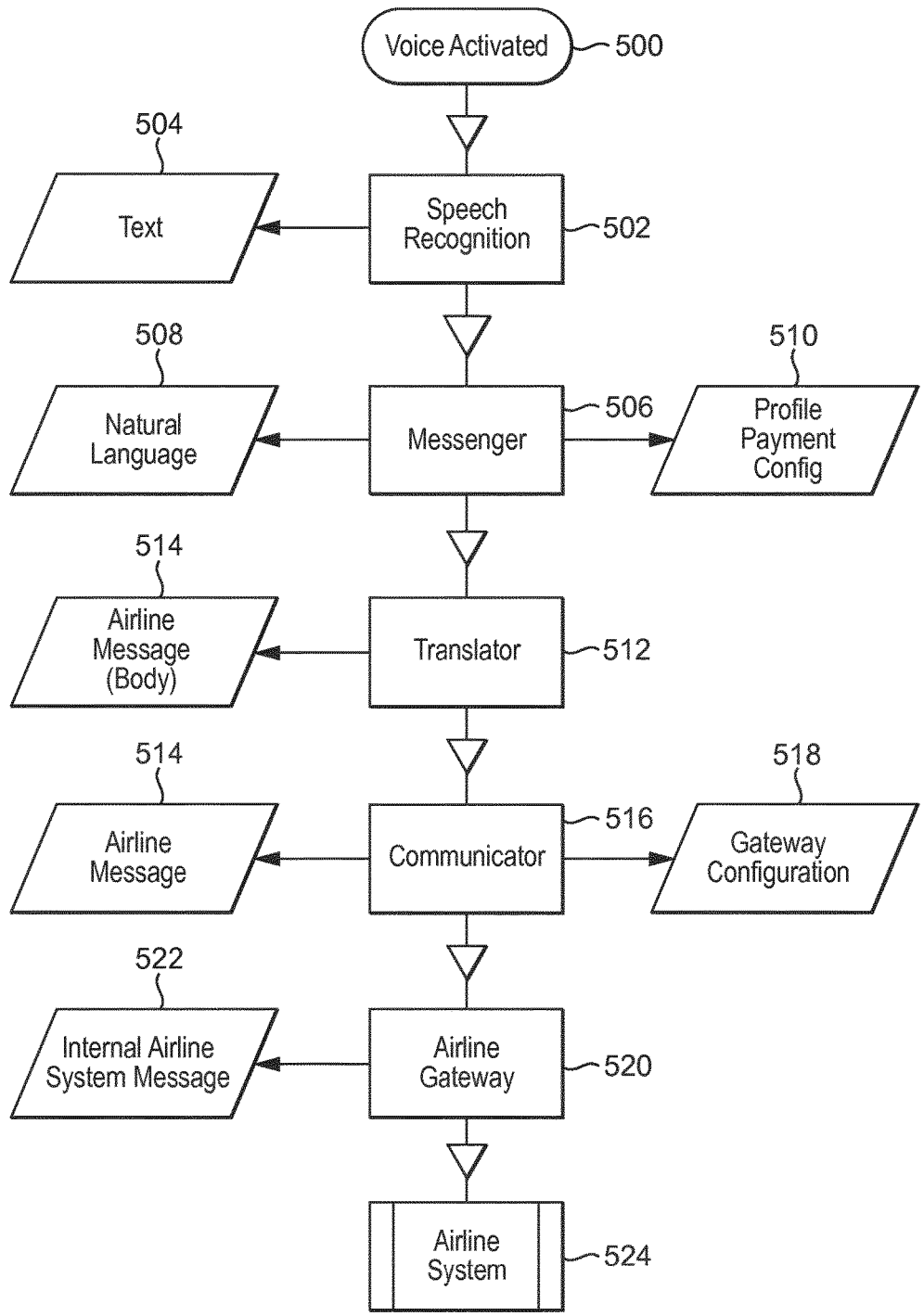
FIG. 5 illustrates the components in the embodiment of FIG. 4.

FIG. 5 illustrates the system from a component perspective. On voice activation at 500 the speech recognition unit 502 generates a text output 504. The text is passed to the messenger 506 which generates both natural language 508 and profile payment configuration, if appropriate, 510. The output of the messenger is passed to the translator 512 which generates an airline message 514 and passes the message to the communicator 516 which outputs both the airline message 514 and gateway configuration 518. The output of the communicator is connected to the airline gateway 520 which outputs internal airline system messages 522 which in turn are passed to the airline core system 524.

In the examples described, the interaction between the user and the system is not via a web call but as either an asynchronous message over the TCP/IP layer or an SMS text message sent over a mobile telephone network. The former can be sent over the internet using TCP/IP protocol to a specified IP address and the latter via the mobile telephone network using the short message service to a specified telephone number or short code. The TCP/IP message is asynchronous and so is not a blocking message such that the communication ends once the message has been sent. Where the message is sent over the mobile phone network the message requires a destination telephone number or short code and the number of characters is restricted. SMS messages sent on the mobile telephone network are limited to 160 characters although longer messages may be sent by joining separate messages together. For messages sent as asynchronous messages over the internet using the TCP/IP layers of the internet protocol suite there is no limit to the number of characters.

The user may message the system in any convenient manner. In one preferred embodiment the user downloads an application from the airline onto their asynchronous/SMS enabled service. The application is a messaging application specific to that airline. Thus, the user does not require the IP address, phone number or short code of the airline for those messages. In another embodiment the user can access a messaging application from which they select the airline to which the message will be sent. Such an application will require the user to provide the IP address, phone number or short code of the selected airline.

As discussed above, translators exist to map between system specific messaging protocols and messaging standards which are recognised throughout the industry. The translator receives messages as free form messages or SMS texts from users and parses those messages to identify message content. This message content can then be mapped onto a standard format that can be recognised by the airline systems. The translator may be at the user device, for example as part of the application on the device or at the airline core system. Alternatively it may be intermediate the device and the core system. The communicator may be viewed as part of the translator or as a separate component. Where the translator and communicator, which may form part of the translator or be a separate component, are resident on the user device, for example as part of an airline application, or as part of a mid-tier between the device and the core system it is presently preferred that communication to and from the airline core system is via IP message. Where the translator/communicator is not at the device, it is preferred that messages between the device and the translator/communicator are text messages such as SMS or MMS messages.

The embodiments described have the advantage that a common message format may be used for all devices which removes the need to develop and maintain many separate device specific applications. This vastly reduces the cost to airlines of providing on-line services. Although of particular benefit to airlines, embodiments of the invention may be used in any industry sector, for example in the banking field to handle online banking, and in the hotel industry and other forms of travel such as road, rail and sea. In contrast to messages sent using web services, the embodiment described above is also particularly suited to environments where bandwidth is limited. Typically, conventional communications using web services require a high bandwidth connection to enable large amounts of data to be transferred to and from the user device. In the airline industry, airline representatives are often located at remote airports which have poor internet access. This is particularly the case with smaller airlines. The embodiment described above is particularly advantageous in such an environment as, whether the connection is via the internet or mobile telephone network, the amount data to be transferred is very much smaller than with a web-based solution as the HTML pages of the web applications that are downloaded are often too large for the available bandwidth.

Although described with respect to text or IP messaging, Internet of Things (IoT) messaging could be used as an alternative. Various protocols have been developed including MQTT intended to collect device data and communicate it to servers.

Although described in terms of passengers making changes to reservations, embodiments of the invention could be used by airline staff at airports or other transport staff at other ports or points of embarkation or debarkation. They may also be used by agents acting as intermediaries between passengers and airlines. Embodiments of the invention are particularly suited to operation in low bandwidth environments such as airports, particularly those located in remote places. Often passengers and others in airports experience very poor connectivity when using public internet and embodiments of the invention may overcome this disadvantage either through the use of text messages or IP messages which may use airlines' bespoke networks or other secure networks available at airports.

Many modifications to the embodiment described are possible and will occur to those skilled in the art without departing from the spirit and scope of the invention which is defined solely by the following claims.

The invention claimed is:

1. A method of communicating between a telecommunications device and a computer system comprising:

receiving an input from the user to a messaging application on the device, the input including metadata and natural language;

communicating the user input to a translator;

at the translator mapping the message to convert the message into a standardised message format at least in part based on the metadata;

sending the standardised message format to a computer system of the receiving party;

wherein at least one of the communicating the user input and sending the standardised message format is performed using an asynchronous message or text message;

receiving a response from the computer system at the translator, the response being in a standardised format;

the translator mapping the response into a human readable form;

communicating the human readable response to the user device;

wherein at least one of the receiving a response from the computer system and the communicating the human readable response is performed using an asynchronous message or text message; and providing the response to the user at the user device.

2. The method according to claim 1, wherein the messaging application is specific to a given service provider or group of providers.

3. The method according to claim 1, wherein the messaging application includes the address of the computer system and identification of the user of the device.

4. The method according to claim 1, wherein the messaging application is common to a plurality of service providers and the user input includes a telephone number or short code of a selected service provider.

5. The method according to claim 1, wherein the text message is transmitted via a mobile telephone network.

6. The method according to claim 1, wherein the asynchronous message is transmitted over the internet using TCP/IP addressing.

7. The method according to claim 1, wherein the input from the user is speech and the device includes a speech recognition application to convert the speech into natural language.

8. The method according to claim 7, wherein the conversion of speech includes identifying at least one keyword in the speech input by the user and converting the keyword into a metadata symbol.

9. The method according to claim 1, wherein the input from the user is text.

10. The method according to claim 1, wherein the response is provided to the user either for display to the user on the telecommunications device or for presentation to the user as speech.

11. The method according to claim 1, wherein the translator is resident on the telecommunications device.

12. The method according to claim 1, wherein the metadata includes at least one emoticon or at least one emoji.

13. The method according to claim 1, wherein the text message is an SMS or MMS text message.

14. The method according to claim 1, comprising adding a header to the translated standardised message, the header including one or more of security information and routing information.

15. A telecommunications device having stored thereon a messaging application, which when run on the device causes the device to receive an input from a user to the messaging application, the input including metadata and natural language;

communicate the user input as an asynchronous message or SMS text message to a translator;

at the translator, map the message to convert the message into a standardised message format at least in part based on the metadata;

send the standardised message format to a computer system of a receiving party;

receive a response from the computer system at the translator, the response being in a standardised format, the translator mapping the response into a human readable form;

communicate the human readable response to the user device as an asynchronous message or SMS text message; and provide the response to the user at the user device.

16. The device according to claim 15, further comprising a communicator arranged to receive the translated standardised message output from the translator and for adding to the output of the translator a header including one or more of security information and routing information.

17. The device according to claim 15, wherein the messaging application is specific to a given service provider or group of providers.

18. The device according to claim 15, wherein the messaging application includes the address of the computer system and identification of the user of the device.

19. The device according to claim 15, wherein the messaging application is common to a plurality of service providers and the user input includes a telephone number or short code of a selected service provider.

20. The device according to claim 15, wherein the text message is transmitted via a mobile telephone network.

21. The device according to claim 15, wherein the asynchronous message is transmitted over the internet using TCP/IP addressing.

22. The device according to claim 15, wherein the input from the user is speech and the device includes a speech recognition application to convert the speech into natural language.

23. The device according to claim 22, wherein the speech recognition application is arranged to identify at least one keyword in the speech input by the user and to convert the keyword into a metadata symbol.

24. The device according claim 15, wherein the metadata includes at least one emoticon or at least one emoji.

25. The device according to claim 15, wherein the text message is an SMS or MMS text message.

26. A method of communicating between a telecommunications device and a computer system comprising:

receiving an input from the user to a messaging application on the device, the input including metadata and natural language;

communicating the user input to a translator;

at the translator mapping the message to convert the message into a standardised message format at least in part based on the metadata;

sending the standardised message format to a computer system of the receiving party;

wherein at least one of the communicating the user input and sending the standardised message format is performed using an IoT messaging protocol;

receiving a response from the computer system at the translator, the response being in a standardised format;

the translator mapping the response into a human readable form;
communicating the human readable response to the user device;
wherein at least one of the receiving a response from the computer system and the communicating the human readable response is performed using an IoT messaging protocol; and
providing the response to the user at the user device.

* * * * *